United States Patent
Morita et al.

(10) Patent No.: US 10,001,212 B2
(45) Date of Patent: Jun. 19, 2018

(54) CONTROL SYSTEM OF MACHINE TOOL

(71) Applicant: FANUC Corporation, Yamanashi (JP)

(72) Inventors: Yuuki Morita, Yamanashi (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 14/860,779

(22) Filed: Sep. 22, 2015

(65) Prior Publication Data

US 2016/0089759 A1   Mar. 31, 2016

(30) Foreign Application Priority Data

Sep. 30, 2014   (JP) .................................. 2014-201699

(51) Int. Cl.
| | | |
|---|---|---|
| G06F 19/00 | (2018.01) | |
| F16H 61/46 | (2010.01) | |
| B23Q 17/00 | (2006.01) | |
| F16H 61/42 | (2010.01) | |
| B23Q 15/12 | (2006.01) | |
| B23Q 17/09 | (2006.01) | |
| G05B 19/404 | (2006.01) | |

(52) U.S. Cl.
CPC ............ F16H 61/46 (2013.01); B23Q 15/12 (2013.01); B23Q 17/008 (2013.01); B23Q 17/0985 (2013.01); F16H 61/42 (2013.01); G05B 19/404 (2013.01)

(58) Field of Classification Search
CPC .. B23Q 35/12; G05B 19/4062; G05B 19/404; F01M 1/02; F16C 33/6625; F16H 61/42; F16H 61/46
See application file for complete search history.

(56) References Cited

U.S. PATENT DOCUMENTS

| | | | |
|---|---|---|---|
| 2,511,956 A | * | 6/1950 | Wetzel ................... B23Q 35/12 200/46 |
| 3,502,881 A | | 3/1970 | Hahn et al. |
| 6,291,959 B1 | | 9/2001 | Yoshida et al. |

(Continued)

FOREIGN PATENT DOCUMENTS

| | | |
|---|---|---|
| CN | 101059697 A | 10/2007 |
| CN | 101530974 A | 9/2009 |

(Continued)

*Primary Examiner* — Tuan Vu
(74) *Attorney, Agent, or Firm* — Hauptman Ham, LLP

(57) ABSTRACT

A control system of a machine tool with a rotary type spindle and a feed axis which generates feed motion of the spindle, comprising a current detecting part which detects a current through a spindle motor for driving the spindle, a temperature detecting part which detects a motor temperature, a remaining time estimating part which uses a predetermined maximum allowable temperature and a detected temperature value by the temperature detecting part as the basis to estimate a remaining time until the motor temperature would reach the maximum allowable temperature on the assumption that the detected current value by the current detecting part at the time of the detected temperature value would continue to flow through the spindle motor, and a feed speed changing part which changes speed of the feed motion in accordance with the estimated value of the remaining time.

4 Claims, 8 Drawing Sheets

(56) References Cited

U.S. PATENT DOCUMENTS

| | | | |
|---|---|---|---|
| 2003/0205984 A1* | 11/2003 | Yoshida | G05B 19/404 318/801 |
| 2007/0200528 A1 | 8/2007 | Itou et al. | |
| 2008/0083585 A1* | 4/2008 | Yanohara | F16C 33/6625 184/6.1 |
| 2012/0123666 A1* | 5/2012 | Stoffels | F01M 1/02 701/113 |
| 2014/0207273 A1 | 7/2014 | Tsutsumi et al. | |
| 2015/0194805 A1* | 7/2015 | Sagasaki | G05B 19/4062 318/569 |

FOREIGN PATENT DOCUMENTS

| | | |
|---|---|---|
| JP | 2000-271836 A | 10/2000 |
| JP | 2003-005836 A | 1/2003 |
| JP | 2014-156005 A | 8/2010 |
| JP | 5224177 B2 | 7/2013 |
| WO | 2005/093942 A1 | 10/2005 |

* cited by examiner

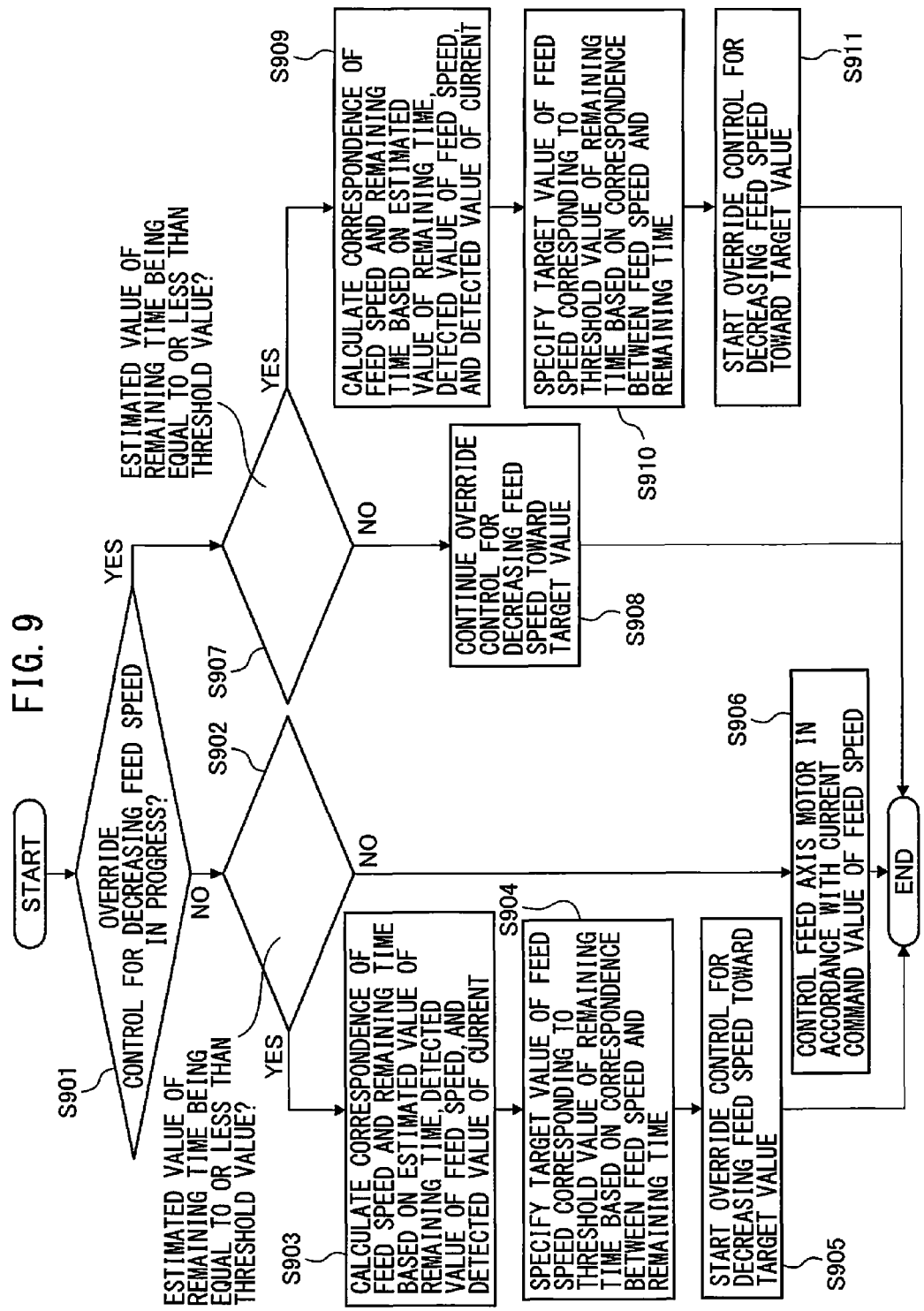

CONTROL SYSTEM OF MACHINE TOOL

RELATED APPLICATIONS

The present application claims priority to Japanese Application Number 2014-201699, filed Sep. 30, 2014, the disclosure of which is hereby incorporated by reference herein in its entirety.

BACKGROUND OF THE INVENTION

1. Field of the Invention

The present invention relates to a control system of a machine tool, more particularly relates to a control system of a machine tool which is capable of changing a speed of feed motion of a spindle.

2. Description of the Related Art

In various fields of machine tools, there is a widely used control method for controlling an operation of a feed axis so that a load applied to the spindle is decreased when a detected temperature of a drive device for a spindle (motor, amplifier, etc.) approaches a maximum allowable temperature. For example, JP2000-271836A proposes a control system which uses results of simulation of an amount of heat generation during fast feed or cutting feed of a feed axis so as to calculate the amount of heat generation during program execution and change a time constant of acceleration/deceleration of a feed operation so that the calculated value is equal to or less than an allowable value. Further, WO2005/093942A proposes a control system which subtracts copper loss and iron loss from a rated loss of a permanent magnet type motor, deems the obtained value as an allowable loss of the motor, and prevent overload of the motor by supplying the motor with a d-axis current corresponding to the obtained value. Further, JP2003-005836A proposes a drive device with a self-protection function, comprising a temperature sensor which detects a temperature of a servo driver (that is, amplifier), and a controller which lowers output of a drive part in accordance with the detected temperature of the temperature sensor.

In this way, a control method for adjusting a load applied to a spindle motor in accordance with a detected temperature of the spindle motor has been known from the prior art. However, a rise rate of the motor temperature fluctuates in accordance with the load applied to the motor at a current point of time, and therefore it is not possible to determine how much time is left before overheating of the motor with the current load being continued even if the prior arts of JP2000-271836A, WO2005/093942A, and JP2003-005836A are used. For this reason, in order to prevent overheating of the motor in the prior arts of JP2000-271836A, WO2005/093942A, and JP2003-005836A, it was necessary to adjust the load applied to the motor on the assumption of a large rise rate of the motor temperature even when the detected motor temperature was relatively low. That is, when the prior arts of JP2000-271836A, WO2005/093942A, and JP2003-005836A are used, it is necessary to conservatively control the operation of the motor, and therefore it is not possible to utilize the capacity of the motor to the maximum extent.

In relation to this, JP2014-156005A proposes a control system with the function of estimating from the current motor temperature and detected current value, the remaining time until a motor would overheat in the case where the current load is continued. However, the control system of JP2014-156005A only displays on a display device, the estimated value of the remaining time until overheating, and therefore the user had to adjust the load applied to the motor in consideration of the displayed remaining time so as to prevent overheating of the motor.

A control system of a machine tool which is capable of reliably preventing a spindle motor from overheating has therefore been sought.

SUMMARY OF INVENTION

According to a first aspect of the present invention, there is provided a control system of a machine tool with a rotary type spindle and a feed axis which generates feed motion of the spindle with respect to a workpiece, comprising: a current detecting part which detects a current which flows through a spindle motor which drives the spindle, a temperature detecting part which detects a temperature of the spindle motor, a remaining time estimating part which uses a predetermined maximum allowable temperature of the spindle motor and a detected temperature value by the temperature detecting part as the basis to estimate a remaining time until the temperature of the spindle motor would reach the maximum allowable temperature on the assumption that the detected current value by the current detecting part at the time of the detected temperature value would continue to flow through the spindle motor, and a feed speed changing part which changes speed of the feed motion in accordance with the estimated value of the remaining time by the remaining time estimating part.

According to a second aspect of the present invention, there is provided the control system of a machine tool in the first aspect, wherein the feed speed changing part decrease speed of the feed motion with a predetermined slope and by a predetermined amount of change if an estimated value of the remaining time by the remaining time estimating part is equal to or less than a predetermined threshold value.

According to a third aspect of the present invention, there is provided the control system of a machine tool in the second aspect wherein the feed speed changing part decreases speed of the feed motion by the amount of change, and then increases speed of the feed motion by another amount of change which is smaller than that amount of change.

According to a fourth aspect of the present invention, there is provided the control system of a machine tool in the first aspect, further comprising a feed speed detecting part which detects speed of the feed motion, a correspondence calculating part which uses the estimated value of the remaining time by the remaining time estimating part, the detected speed value by the feed speed detecting part, and the detected current value by the current detecting part as the basis to calculate the correspondence between speed of the feed motion and the remaining time if the estimated value of the remaining time by the remaining time estimating part is equal to or less than a predetermined threshold value, and a feed speed specifying part which specifies a speed value of the feed motion corresponding to the threshold value of the remaining time, from the correspondence calculated by the correspondence calculating part, wherein the feed speed changing part decreases speed of the feed motion toward the speed value specified by the feed speed specifying part.

These and other objects, features, and advantages of the present invention will become clearer with reference to the detailed description of an illustrative embodiment of the present invention which is shown in the attached drawings.

BRIEF DESCRIPTION OF THE DRAWINGS

FIG. 9 is a flowchart which shows a specific routine of the override control which is shown in FIG. 8.

DETAILED DESCRIPTION OF EMBODIMENTS

Figure 1:
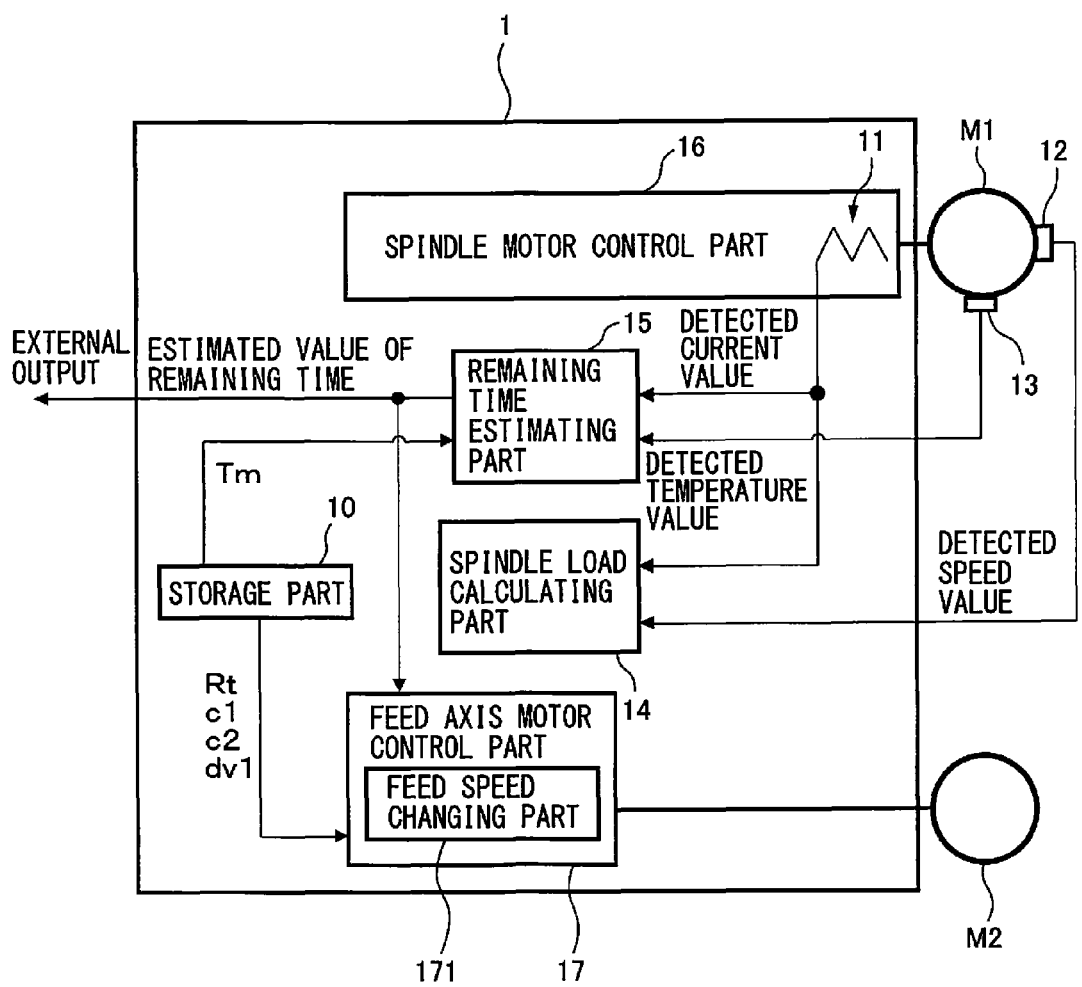
FIG. 1 is a block diagram which shows a configuration of a control system of a first embodiment.

Below, embodiments of the present invention will be explained in detail with reference to the drawings. In the drawings, similar component elements are assigned similar reference notations. Note that the following explanation does not limit the technical scope of the invention which is described in the claims or the meaning of terms etc.

Referring to FIG. 1 to FIG. 5, a control system of a first embodiment will be explained. FIG. 1 is a block diagram which shows the configuration of an illustrative control system 1 of the present embodiment. The control system 1 of the present example controls the operation of a machine tool which is provided with a rotary type spindle to which a cutting tool is attached, and a feed axis which generates feed motion of the spindle with respect to a workpiece. FIG. 1 shows the spindle motor M1 and feed axis motor M2 for driving the spindle and feed axis of the machine tool, together with the control system 1.

As shown in FIG. 1, the control system 1 of the present example has a current detecting part 11, speed detecting part 12, and temperature detecting part 13. These functions will be explained in order below. The current detecting part 11 of the present example is a current detection device which is built into a spindle motor control part 16 for driving the motor, and has the function of detecting the current which flows through the spindle motor M1. The speed detecting part 12 of the present example is an encoder which is attached to the spindle motor M1, and has the function of detecting the rotational speed of the spindle motor M1. The temperature detecting part 13 of the present example is a temperature detection element which is attached to the spindle motor M1, and has the function of detecting the temperature of the spindle motor M1. Note that, the boundary temperature at which the spindle motor M1 of the present example would fall into an overheated state is determined in advance experimentally or theoretically. Such a temperature will be referred to below as the "maximum allowable temperature".

With reference to FIG. 1, the control system 1 of the present example further has a storage part 10, spindle load calculating part 14, remaining time estimating part 15, spindle motor control part 16, and feed axis motor control part 17. Functions of these parts will be explained in order below. The storage part 10 of the present example is a storage area such as a ROM, RAM, nonvolatile memory, etc. and has the function of holding various data. In particular, the storage part 10 of the present example stores the maximum allowable temperature Tm of the spindle motor M1 and the later explained threshold value Rt, slopes c1 and c2 of speed change, amount of speed change dv1, and other data. Here, the maximum allowable temperature Tm is the boundary temperature at which the spindle motor M1 would fall in an overheated state. The maximum allowable temperature Tm is determined in advance by the user experimentally or theoretically. The spindle load calculating part 14 of the present example has the function of calculating the load which is applied to the spindle motor M1, based on the detected current value by the current detecting part 11 and the detected speed value by the speed detecting part 12.

Next, the remaining time estimating part 15 of the present example has the function of estimating the remaining time until the temperature of the spindle motor M1 would reach the above maximum allowable temperature Tm (that is, the remaining time until the spindle motor M1 would overheat) if the detected current value by the current detecting part 11 continues to flow through the spindle motor M1 without changing. As shown in FIG. 1, the remaining time estimating part 15 of the present example estimates the above remaining time based on the data of the maximum allowable temperature Tm of the spindle motor M1 which is stored in advance in the storage part 10, the detected current value by the current detecting part 11, and the detected speed value by the speed detecting part 12. The routine by which the remaining time estimating part 15 of the present example estimates the remaining time will be explained in detail below.

In general, it is known that the temperature rise of a motor when a certain current value continues to flow through the motor is proportional to the square of that current value. For this reason, the temperature rise Tc per unit time of the motor is obtained from the current I which flows through the motor by the following formula (1).

$$Tc = K1 \times I^2 \quad (1)$$

Here, the constant K1 is calculated in advance by experiments. That is, the constant K1 is calculated in reverse from the temperature rise when a certain current value continues to flow through a motor.

Further, if the temperature rise T of the motor is obtained with a predetermined sampling period Ts, the temperature rise T(n) at the n-th sampling is expressed by the following recurrence relation (2).

$$T(n) = \lambda \times T(n-1) + (1-\lambda) \times Tc \quad (2)$$

Here, the constant $\lambda$ in the above recurrence relation (2) is obtained from the sampling period Ts and heat constant T of the motor by the following formula (3).

$$\lambda = \exp(-Ts/\tau) \quad (3)$$

By deforming the above recurrence relation (2), the following formula (4) can be obtained.

$$T(n) = \lambda^n (T(0) - Tc) + Tc \quad (4)$$

In the above formula (4), T(0) is the initial value of the temperature rise T(n) of the motor, that is, the temperature difference between the temperature of the motor and the ambient temperature at a certain point of time.

Using the above formula (4), it is possible to obtain the temperature rise T(n) at any point of time from the initial value T(0) of the temperature rise of the motor.

By further deforming the above formula (4), the following formula (5) can be obtained.

$$n = 1/\ln(\lambda) \times \ln\{(T(n)-Tc)/(T(0)-Tc)\} \quad (5)$$

Under the assumption that the temperature of the motor reaches the maximum allowable temperature Tm at the n-th sampling and, the following formula (6) can be obtained by entering T(n)=Talm in the above formula (5). Here, Talm is the temperature rise corresponding to the maximum allowable temperature Tm.

$$n = 1/\ln(\lambda) \times \ln\{(Talm-Tc)/(T(0)-Tc)\} \quad (6)$$

Under the above assumption, the required time from when the sampling is started to when the temperature of the motor reaches the maximum allowable temperature Tm is obtained by multiplying Ts and "n". Therefore, the remaining time R until the temperature of the spindle motor M1 would reach the maximum allowable temperature Tm if the current value detected at a certain point of time continues to flow through the spindle motor M1 can be obtained from the temperature difference T(0) between the temperature of the spindle motor M1 which is detected at that point of time and the ambient temperature by the following formula (7):

$$R = Ts \times n = Ts/\ln(\lambda) \times \ln\{(Talm-Tc)/(T(0)-Tc)\} \quad (7)$$

The remaining time estimating part 15 of the present example uses the above formula (7) to estimate the remaining time R. JP2014-156005A shows a similar method of estimation.

With reference to FIG. 1, the spindle motor control part 16 of the present example is a motor driver which controls the operation of the spindle motor M1. More specifically, the spindle motor control part 16 of the present example adjusts the amount, direction, timing, etc. of the current which is supplied to the spindle motor M1 so as to control the operation of the spindle motor M1. Further, the feed axis motor control part 17 of the present example is a motor driver which controls the operation of the feed axis motor M2. More specifically, the feed axis motor control part 17 of the present example adjusts the amount, direction, timing, etc. of the current which is supplied to the feed axis motor M2 so as to control the operation of the feed axis motor M2. As shown in FIG. 1, the feed axis motor control part 17 of the present example includes a feed speed changing part 171. Further, the feed speed changing part 171 of the present example performs override control of the feed axis motor M2 in accordance with the estimated value of the remaining time R which was obtained by the remaining time estimating part 15. In particular, the feed speed changing part 171 of the present example performs override control which decreases the speed of feed motion by the feed axis motor M2 when the remaining time R estimated by the remaining time estimating part 15 is equal to or less than the predetermined threshold value. Below, the speed of feed motion due to the feed axis motor M2 will be simply called the "feed speed".

Figure 2:
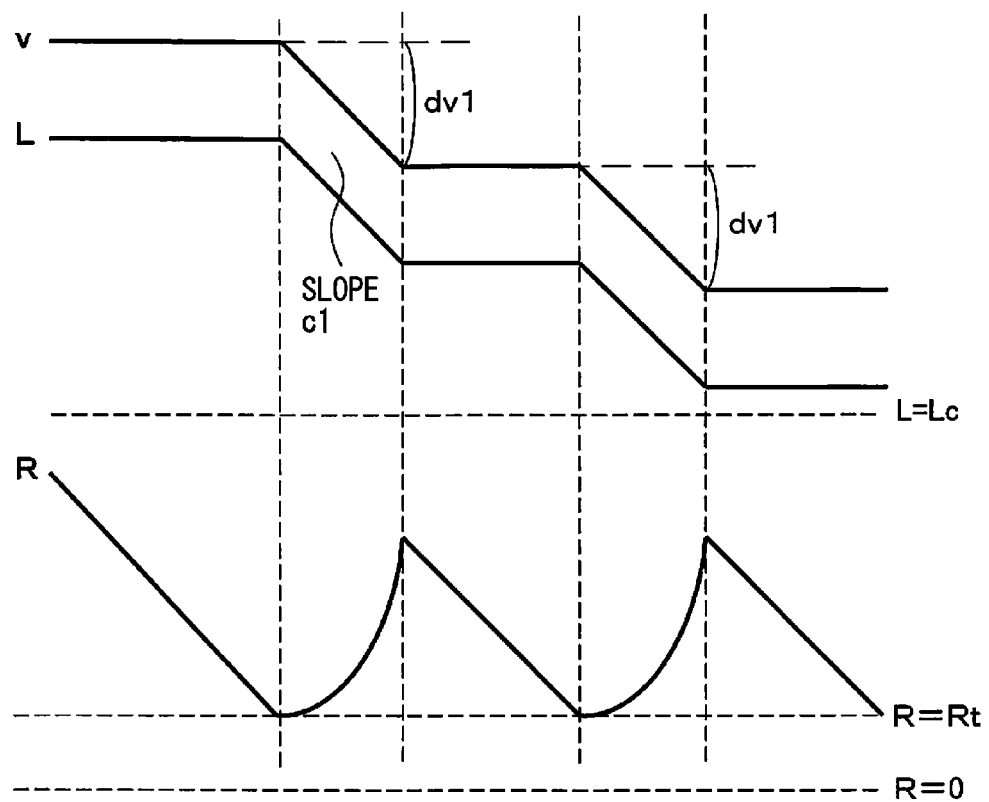
FIG. 2 is a graph which shows a temporal change of a feed speed due to typical override control which is performed by a feed axis motor control part in FIG. 1.

FIG. 2 is a graph which shows the temporal change of the feed speed "v" due to the illustrative override control which is performed by the feed axis motor control part 17 in FIG. 1. The graph of FIG. 2 shows the temporal changes of the load L which is applied to the spindle motor M1 and the remaining time R up to overheat, together with the temporal change of the feed speed "v". As will be understood from FIG. 2, in the override control of the present example, if the estimated value of the remaining time R by the remaining time estimating part 15 is equal to or less than the threshold value Rt, the feed speed changing part 171 decreases the feed speed "v" with the slope c1 of speed change and by the amount of speed change dv1. The above slope c1 of speed change and the amount of speed change dv1 are stored in advance in the storage part 10. In this way, according to the override control of the present example, if the remaining time R is equal to or less than the threshold value Rt, the feed speed "v" decreases by the amount of speed change dv1, and therefore the load of the spindle motor M1 also decreases by the corresponding amount of change. This ensures that the remaining time R temporarily increases, and therefore it is possible to reliably prevent the temperature of the spindle motor M1 from rising up to the maximum allowable temperature Tm, and thus prevent the spindle motor M1 from falling into an overheated state.

As will be understood from FIG. 2, if the load L of the spindle motor M1 is larger than the continuous rated value Lc even after the feed speed "v" has decreased by a predetermined speed change amount dv1, the cutting operation is continued so that the remaining time R further decreases toward the threshold value Rt. For this reason, during the time when the cutting operation is continued, the feed axis motor control part 17 monitors the remaining time R while repeating the above override control until the load L becomes equal to or less than the continuous rated value Lc. Note that, the slope c1 of speed change and the amount of the speed change dv1 which are used when the above override control is repeated may be uniform values over all the cycles or may be values which change for each cycle.

Figure 3:
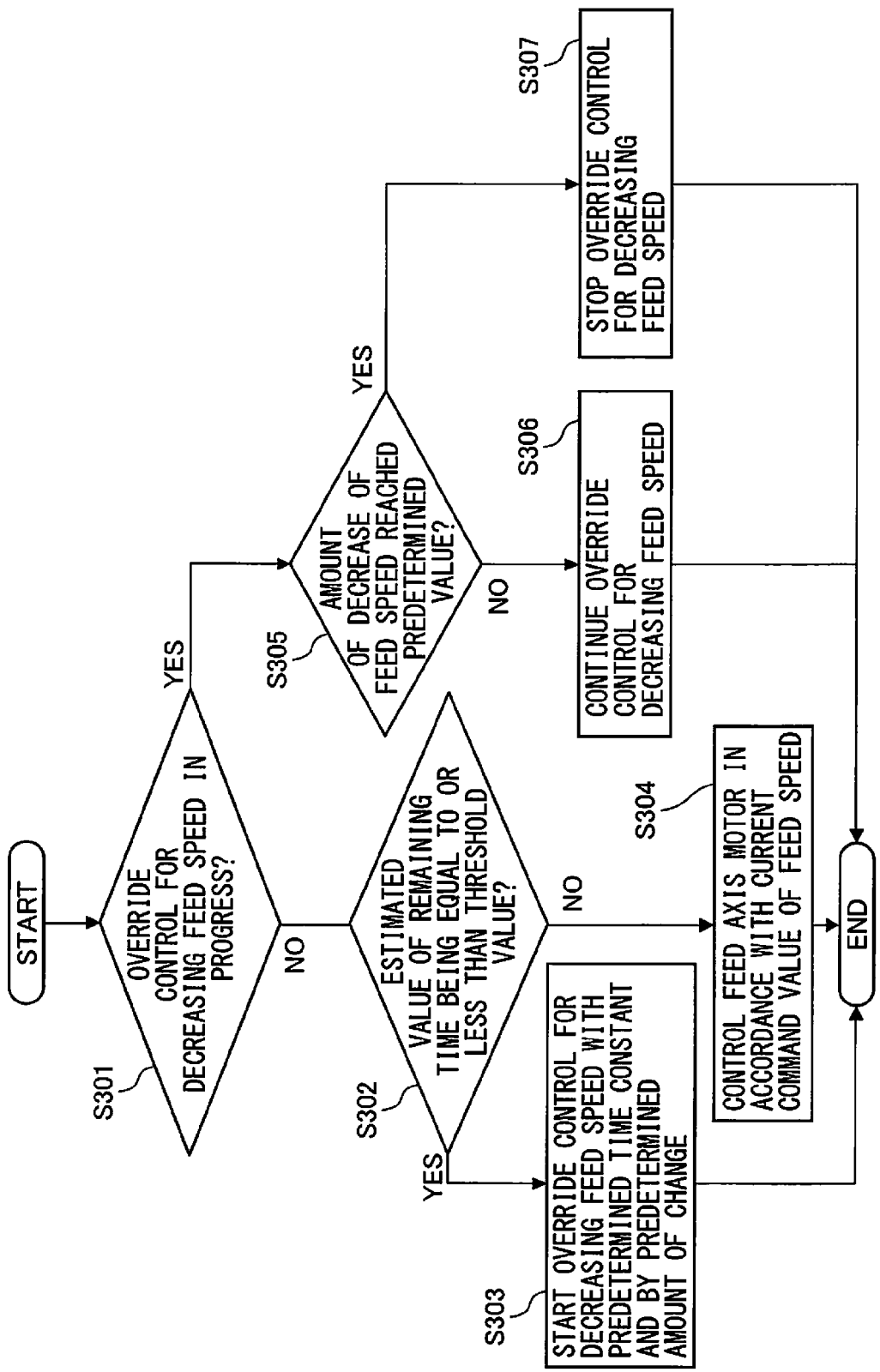
FIG. 3 is a flowchart which shows a specific routine of the override control which is shown in FIG. 2.

FIG. 3 is a flowchart which shows the specific routine of the override control which is shown in FIG. 2. As shown in FIG. 3, first, at step S301, the feed axis motor control part 17 judges if override control for decreasing the feed speed "v" is in progress. When it is judged at step S301 that override control for decreasing the feed speed "v" is not in progress (NO at step S301), the feed axis motor control part 17 further judges if the estimated value of the remaining time R obtained by the remaining time estimating part 15 is equal to or less than a predetermined threshold value Rt (step S302).

When it is judged at step S302 that the estimated value of the remaining time R is equal to or less than the threshold value Rt (YES at step S302), the feed speed changing part 171 of the feed axis motor control part 17 starts override control for decreasing the feed speed "v" with a predetermined slope c1 of speed change and amount of speed change dv1 (step S303). Along with the decrease of the feed speed v, the load L of the spindle motor M1 also decreases, and therefore the remaining time R up until overheat temporarily increases (see FIG. 2). When it is judged at step S302 that the estimated value of the remaining time R is not equal to or less than the threshold value Rt, that is, if the estimated value of the remaining time R is larger than the threshold value Rt (NO at step S302), the feed axis motor control part 17 controls the feed axis motor M2 in accordance with the command value of the current feed speed "v" (step S304).

When it is judged at step S301 that override control for decreasing the feed speed "v" is in progress (YES at step S301), the feed speed changing part 171 of the feed axis motor control part 17 judges if the amount of decrease of the feed speed "v" due to the override control has reached a predetermined value (amount of speed change dv1) (step S305). When it is judged at step S305 that the amount of decrease of the feed speed "v" has reached a predetermined value (NO at step S305), the feed speed changing part 171 of the feed axis motor control part 17 continues the override control for decreasing the feed speed "v" (step S306). When it is judged at step S305 that the amount of decrease of the feed speed "v" has reached a predetermined value (YES at step S305), the feed speed changing part 171 of the feed axis motor control part 17 stops the override control for decreasing the feed speed "v" (step S307).

Figure 4:
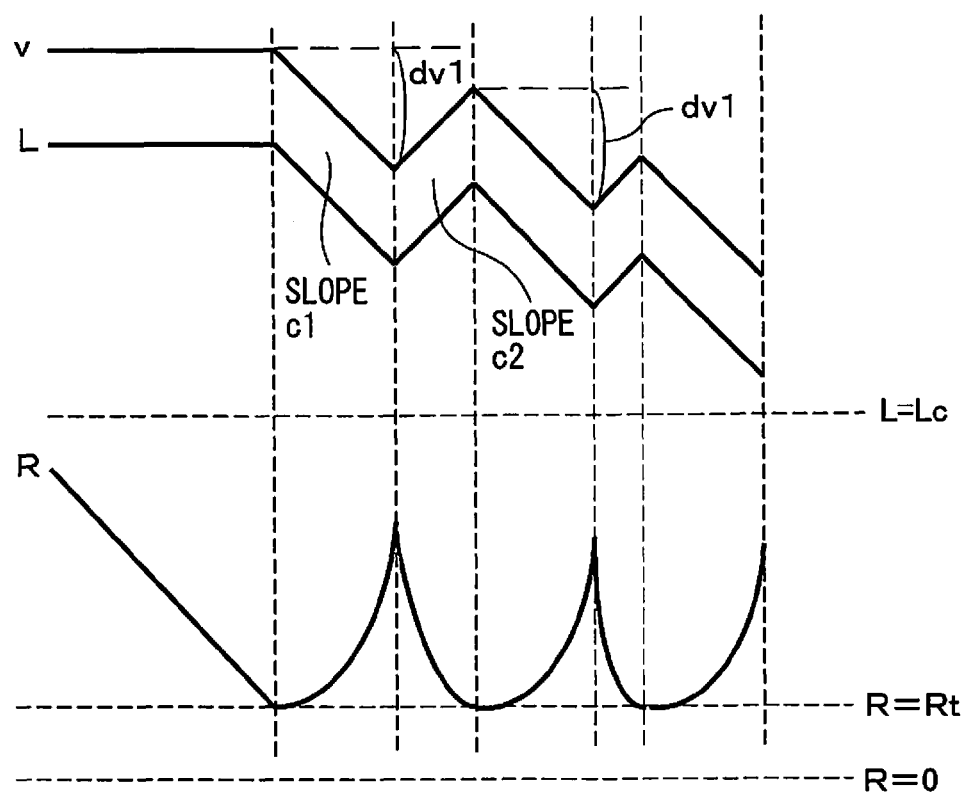
FIG. 4 is a graph which shows a temporal change of a feed speed due to modified override control which is performed by the feed axis motor control part in FIG. 1.

Next, a modification of the override control performed by the feed axis motor control part 17 in FIG. 1 will be explained. FIG. 4 is a graph which shows the temporal change of the feed speed "v" according to the override control of the present example. In the same way as the graph of the above-explained FIG. 2, the graph of FIG. 4 shows the temporal changes of the load L which is applied to the spindle motor M1 and the remaining time R until overheat, together with the temporal change of the feed speed "v". As will be understood from FIG. 4, in the override control of the present example, when the estimated value of the remaining time R by the remaining time estimating part 15 is equal to or less than the threshold value Rt, the feed speed changing part 171 decreases the feed speed "v" with the slope c1 of speed change and by the amount of speed change dv1. The slope c1 of speed change and the amount of speed change dv1 are stored in advance in the storage part 10. Furthermore, in the override control of the present example, the feed speed "v" decreases by the amount of speed change, then the feed speed changing part 171 increases the feed speed "v" with another slope c2 of speed change and by an amount of speed change which is smaller than the amount of speed change dv1. More specifically, the feed speed changing part 171 increases the feed speed "v" until the remaining time R again becomes equal to or less than the threshold value Rt. The slope c2 of speed change is stored in advance in the storage part 10.

As will be understood from FIG. 4, in the override control of the present example, once the remaining time R increases, the feed speed "v" increases with the slope c2 of speed change of speed, and therefore the load L of the spindle motor M1 also correspondingly increases. That is, the override control of the present example makes the feed speed "v" closer to the speed before the decrease and increases the load L which is applied to the spindle motor M1 once the remaining time R is increased, and therefore it is possible to make more effective use of the capacity of the spindle motor M1. As a result, according to the override control of the present example, it is possible to complete a cutting operation in a relatively short time. As will be understood from FIG. 4, if the load L of the spindle motor M1 is larger than the continuous rated value Lc even after the feed speed "v" has been changed with the slopes c1 and c2 of speed change, the cutting operation is continued so that the remaining time R decreases toward the threshold value Rt. For this reason, during the time when the cutting operation is continued, the feed axis motor control part 17 monitors the remaining time R while repeating the above override control until the load L becomes equal to or less than the continuous rated value Lc. Note that, the slopes c1 and c2 of speed change and the amount of speed change dv1 which are used when the override control is repeated may be uniform values over all the cycles or may be values which change for each cycle.

Figure 5:
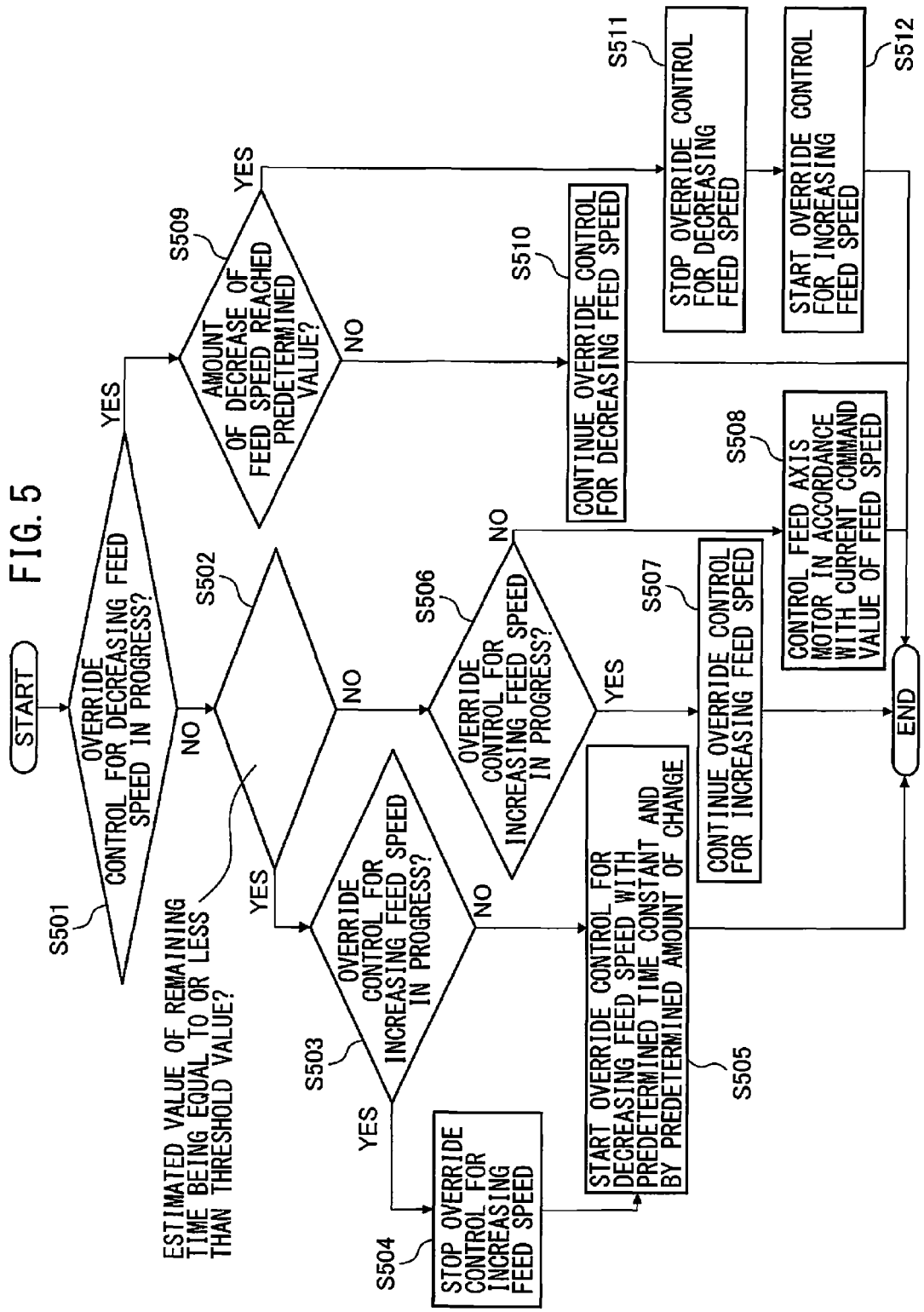
FIG. 5 is a flowchart which shows a specific routine of the override control which is shown in FIG. 4.

FIG. 5 is a flowchart which shows a specific routine of the override control which is shown in FIG. 4. As shown in FIG. 5, first, at step S501, the feed axis motor control part 17 judges if override control for decreasing the feed speed "v" is in progress. When it is judged at step S501 that override control for decreasing the feed speed "v" is not in progress (NO at step S501), the feed axis motor control part 17 further judges if the estimated value of the remaining time R obtained by the remaining time estimating part 15 is equal to or less than a predetermined threshold value Rt (step S502). When it is judged at step S502 that the estimated value of the remaining time R is equal to or less than the threshold value Rt (YES at step S502), the feed axis motor control part 17 further judges if override control for increasing the feed speed "v" is in progress (step S503).

When it is judged at step S503 that override control for increasing the feed speed "v" is in progress (YES at step S503), the feed speed changing part 171 of the feed axis motor control part 17 stops the override control for increasing the feed speed "v" (step S504), and then starts override control for decreasing the feed speed "v" with a predetermined slope c1 of speed change and amount of speed change dv1 (step S505). When it is judged at step S503 that override control for increasing the feed speed "v" is not in progress (NO at step S503), the feed speed changing part 171 of the feed axis motor control part 17 starts override control for decreasing the feed speed "v" with a predetermined slope c1 of speed change and amount of speed change dv1 (step S505). Along with the decrease of the feed speed "v", the load L of the spindle motor M1 also decreases, and therefore the remaining time R until overheat temporarily increases (see FIG. 4).

When it is judged at step S502 that the estimated value of the remaining time R is not equal to or less than the threshold value Rt, that is, when the estimated value of the remaining time R is larger than the threshold value Rt (NO at step S502), the feed axis motor control part 17 further judges if the override control for increasing the feed speed "v" is in progress (step S506). When it is judged at step S506 that override control for increasing the feed speed "v" is in progress (YES at step S506), the feed speed changing part 171 of the feed axis motor control part 17 continues the override control for increasing the feed speed "v" (step S507). When it is judged at step S506 that the override control for increasing the feed speed "v" is not in progress (NO at step S506), the feed axis motor control part 17 controls the feed axis motor M2 in accordance with the current command value of the feed speed "v" (step S508).

When it is judged at step S501 that override control for decreasing the feed speed "v" is in progress (YES at step S501), the feed speed changing part 171 of the feed axis motor control part 17 judges if the amount of decrease of the feed speed "v" due to override control has reached a predetermined value (amount of change of speed dv1) (step S509). When it is judged at step S509 that the amount of decrease of the feed speed "v" has not reached a predetermined value (NO at step S509), the feed speed changing part 171 of the feed axis motor control part 17 continues the override control for decreasing the feed speed "v" (step S510). When it is judged at step S509 that the amount of decrease of the feed speed "v" has reached a predetermined value (YES at step S509), the feed speed changing part 171 of the feed axis motor control part 17 stops the override control for decreasing the feed speed "v" (step S511), and then starts override control for increasing the feed speed "v" with another slope c2 of speed change (step S512). Along with the increase of the feed speed "v", the load L of the spindle motor M1 also increases, and therefore the capacity of the spindle motor M1 is more effectively utilized (see FIG. 4).

In the above way, according to the control system 1 of the present embodiment, when the remaining time R until the temperature of the spindle motor M1 reaches the maximum allowable temperature Tm is equal to or less than the threshold value Rt, the feed speed "v" is changed in accordance with the remaining time R at that instant, and therefore it is possible to reliably prevent the spindle motor M1 from falling into an overheated state. In particular, according to the embodiment which is shown in FIG. 2, override control for decreasing the feed speed "v" with a predetermined slope c1 of speed change and amount of speed change is performed, and therefore it is possible to simplify the feed speed changing part 171 in configuration and thus lighten the system load due to the override control. Further, according to the embodiment which is shown in FIG. 4, override control is performed so that the feed speed "v" decreases and then increases, and therefore it is possible to prevent the load of the spindle motor M1 from being held at a low level and thus utilize the capacity of the spindle motor M1 more effectively.

Next, with reference to FIG. 6 to FIG. 9, a control system of a second embodiment of the present invention will be explained. The control system of the present embodiment has functions and a configuration similar to the control system of the above-mentioned first embodiment except for the parts which are explained specifically below. For this reason, parts similar to the first embodiment will use reference notations common with those of the first embodiment and detailed explanations of those similar parts will be omitted.

Figure 6:
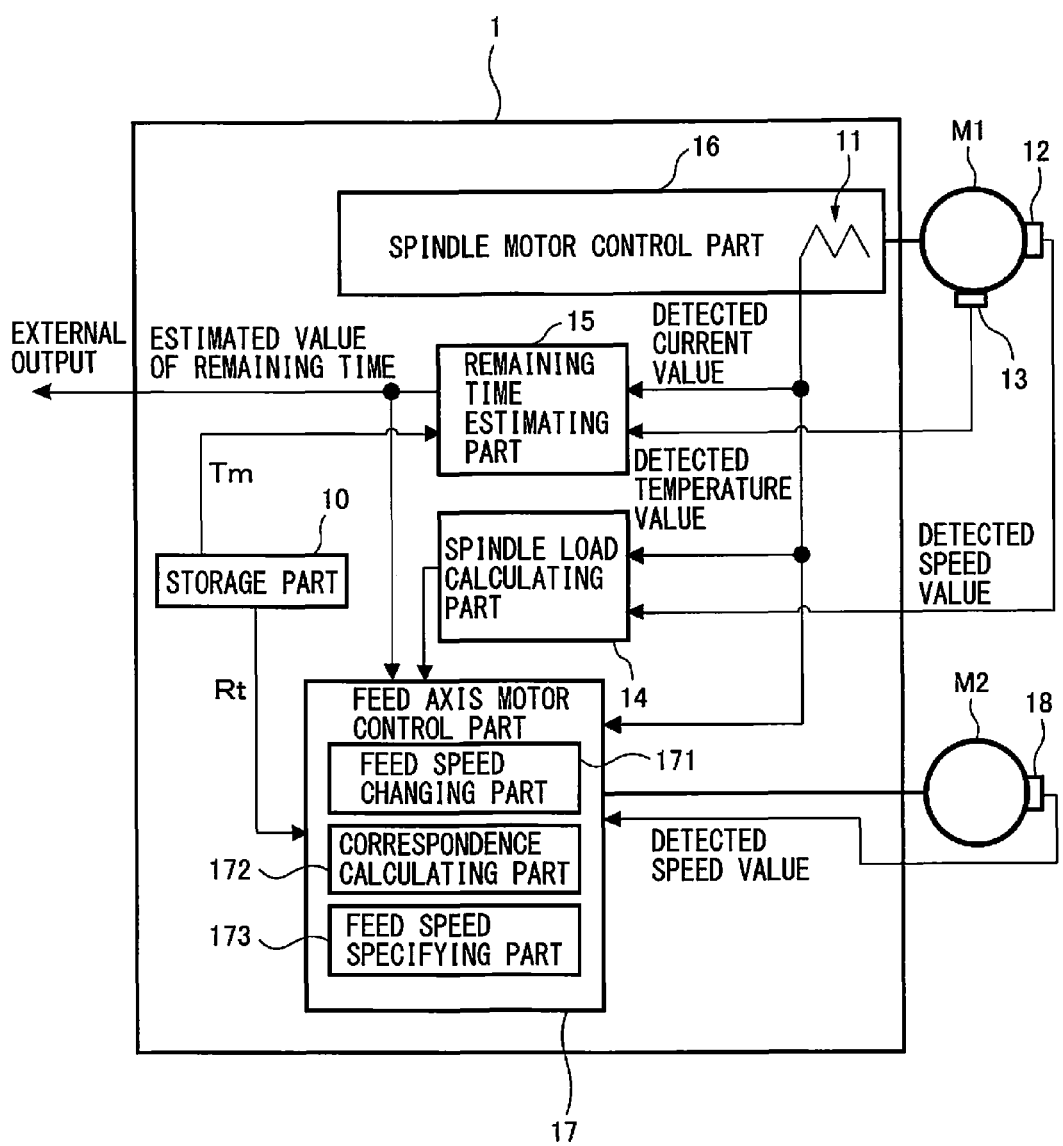
FIG. 6 is a block diagram which shows the configuration of a control system of a second embodiment.

FIG. 6 is a block diagram which shows the configuration of an illustrative control system of the present embodiment. As shown in FIG. 6, the control system 1 of the present example has a feed speed detecting part 18 in addition to the above-mentioned storage part 10, current detecting part 11, speed detecting part 12, temperature detecting part 13, spindle load calculating part 14, remaining time estimating part 15, spindle motor control part 16, and feed axis motor control part 17. The feed speed detecting part 18 of the present example is an encoder which is attached to the feed axis motor M2 and has the function of detecting the rotational speed of the feed axis motor M2, that is, the feed speed "v". Further, the feed axis motor control part 17 of the present example has a correspondence calculating part 172 and a feed speed specifying part 173 in addition to the above-mentioned feed speed changing part 171. Functions of these parts will be explained below.

Figure 7:
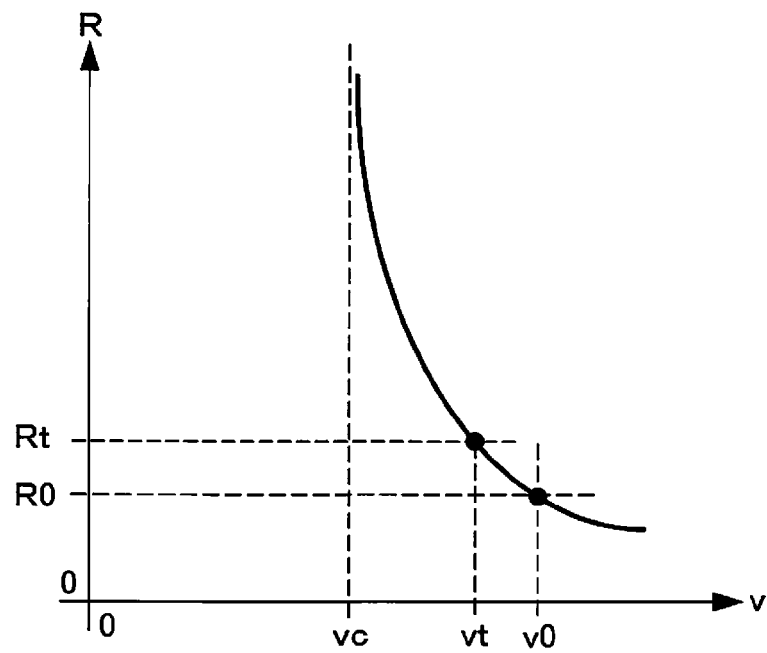
FIG. 7 is a graph which shows the correspondence between a feed speed and a remaining time calculated by a correspondence calculating part in FIG. 6.

The correspondence calculating part 172 of the present example has the function of calculating the correspondence between the feed speed "v" and the remaining time R, using the estimated value of the remaining time R by the remaining time estimating part 15, the detected value of the feed speed "v" by the feed speed detecting part 18, and the detected current value by the current detecting part 11. However, the correspondence calculating part 172 may also calculate the above correspondence, using the calculated value of the load L by the spindle load calculating part 14, instead of the detected current value by the current detecting part 11. FIG. 7 is a graph which shows the correspondence between the feed axis speed "v" and remaining time R calculated by the correspondence calculating part 172 in FIG. 6. The principle behind such a correspondence being calculated will be explained below.

In general, the amount of cutting by the spindle motor M1 is proportional to the feed speed "v", and therefore the load L which is applied to the spindle motor M1 is proportional to the feed speed "v" (that is, $L \propto v$). Further, the current I which flows through the spindle motor M1 is proportional to the load L which is applied to the spindle motor M1 (that is, $I \propto L$), and therefore the current I which flows through the spindle motor M1 is also proportional to the feed speed "v" (that is, $I \propto v$). As will be understood from the above formulas (1) and (7), the remaining time R is expressed by a function R(I) of the current I. As explained above, the current I is proportional to the feed speed "v" (that is, $I \propto v$), and therefore the remaining time R is also expressed by a function R(v) of the feed speed "v". That is, if the values of the remaining time R, current I, and feed speed "v" at a certain point of time are known, the function R(v) of the remaining time R can be uniquely determined, and therefore the correspondence between the feed speed "v" and the remaining time R can be calculated. A graph of the function R(v) which is determined from the values (R0, I0, and v0) of the remaining time R, current I, and feed speed "v" at a certain point of time is shown in FIG. 7. The graph of FIG. 7 indicates that if the feed motion of the spindle is continued at a certain feed speed v0, the spindle motor M1 will overheat after the elapse of the remaining time R0 corresponding to the feed speed. Note that, the feed speed vc in FIG. 7 is the value of the feed speed "v" when the load L of the spindle motor M1 is equal to the continuous rated value Lc.

Figure 8:
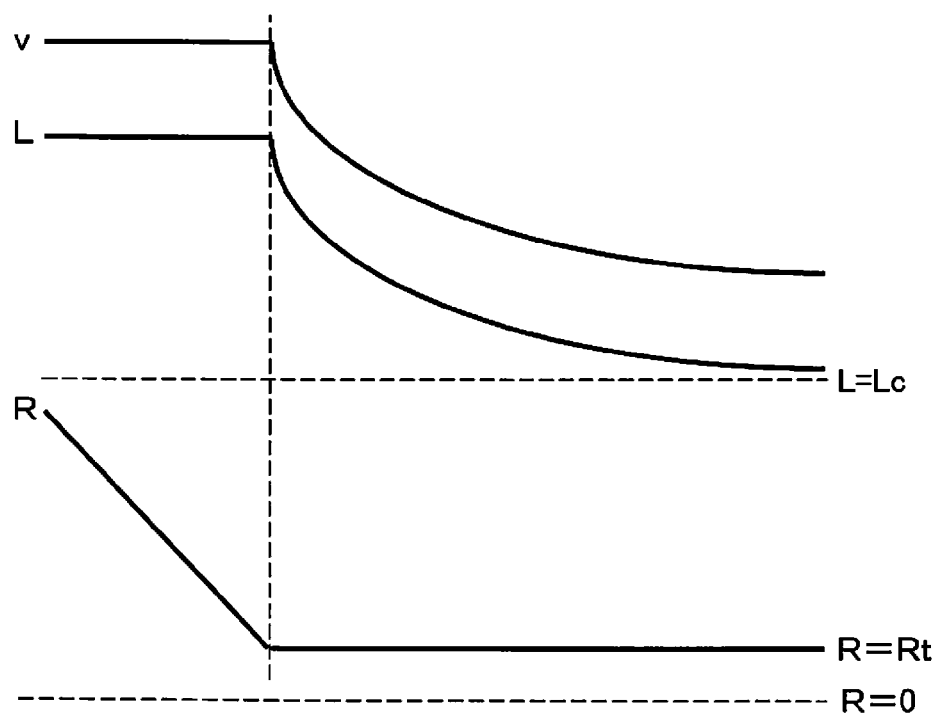
FIG. 8 is a graph which shows a temporal change of a feed speed due to typical override control which is performed by the feed axis motor control part in FIG. 6.

With reference to FIG. 6, the feed speed specifying part 173 of the present example has the function of specifying the value vt of the feed speed "v" corresponding to the threshold value Rt of the remaining time R with reference to the correspondence between the feed speed "v" and the remaining time R calculated by the correspondence calculating part 172 (see FIG. 7). The value vt specified by the feed speed specifying part 173 is treated as the target value when the feed speed changing part 171 changes the feed speed "v". That is, the feed speed changing part 171 of the present example performs override control for decreasing the feed speed "v" toward the target value vt specified by the feed speed specifying part 173 when the remaining time R estimated by the remaining time estimating part 15 becomes equal to or less than the threshold value Rt. FIG. 8 is a graph which shows the temporal change of the feed speed "v" due to illustrative override control which is performed by the feed axis motor control part 17 in FIG. 6. In the same way as the graphs of the above-mentioned FIG. 2 and FIG. 4, the graph of FIG. 8 shows the temporal changes of the load L which is applied to the spindle motor M1 and the remaining time R until overheating, together with the temporal change of the feed speed "v".

In the override control of the present example, once the estimated value of the remaining time R by the remaining time estimating part 15 becomes equal to or less than the threshold value Rt, the feed speed changing part 171 decreases the feed speed "v" toward a target value vt specified by the feed speed specifying part 173. This target value vt is a value which corresponds to the threshold value Rt of the remaining time R (see FIG. 7), and therefore even if the feed speed "v" decreases to the target value vt, the remaining time R will never excessively increase over the threshold value Rt. Therefore, according to the override control of the present example, it is possible to minimize the decrease in the load L of the spindle motor M1 due to the decrease of the feed speed "v".

In the same way as the examples of FIG. 2 and FIG. 4, during the time when the cutting operation is continued, the feed axis motor control part 17 monitors the remaining time R while repeating the override control until the load L of the spindle motor M1 becomes equal to or less than the continuous rated value Lc. This ensures that the remaining time R is maintained near the threshold value Rt, and therefore the load L of the spindle motor M1 decreases toward the continuous rated value Lc, as shown in FIG. 8. Therefore, according to the override control of the present example, it is possible to utilize the capacity of the spindle motor M1 to the maximum extent, and thus complete the cutting operation in the shortest time.

FIG. 9 is a flowchart which shows a specific routine of the override control which is shown in FIG. 8. As shown in FIG. 9, first, at step S901, the feed axis motor control part 17 judges if override control for decreasing the feed speed "v" is in progress. When it is judged at step S901 that override control for decreasing the feed speed "v" is not in progress (NO at step S901), the feed axis motor control part 17 judges if the estimated value of the remaining time R obtained by the remaining time estimating part 15 is equal to or less than a predetermined threshold value Rt (step S902).

When it is judged at step S902 that the estimated value of the remaining time R is equal to or less than the threshold value Rt (YES at step S902), the correspondence calculating part 172 of the feed axis motor control part 17 calculates the correspondence between the feed speed "v" and the remaining time R, based on the estimated value of the remaining time R by the remaining time estimating part 15, the detected value of the feed speed "v" by the feed speed detecting part 18, and the detected current value by the current detecting part 11 (step S903). Next, at step S904, the feed speed specifying part 173 of the feed axis motor control part 17 specifies the target value vt of the feed speed "v" which corresponds to the threshold value Rt of the remaining time R, based on the correspondence between the feed speed "v" and the remaining time R (see FIG. 7) to. Next, at step S905, the feed speed changing part 171 of the feed axis motor control part 17 starts override control for decreasing the feed speed "v" toward the above target value vt.

When it is judged at step S902 that the estimated value of the remaining time R is not equal to or less than the threshold value Rt, that is, when the estimated value of the remaining time R is larger than the threshold value Rt (NO at step S902), the feed axis motor control part 17 controls the feed axis motor M2 in accordance with the current command value of the feed speed "v" (step S906). When it was judged at step S901 that override control for decreasing the feed speed "v" is in progress (YES at step S901), the feed axis motor control part 17 judges if the estimated value of the remaining time R is equal to or less than the threshold value Rt (step S907), in the same way as the above step S902. When it is judged at step S907 that the estimated value of the remaining time R is not equal to or less than the threshold value Rt, that is, when the estimated value of the remaining time R is larger than the threshold value Rt (NO at step S902), the feed speed changing part 171 of the feed axis motor control part 17 continues override control for decreasing the feed speed "v" toward the above target value vt (step S908).

When it is judged at step S907 that the estimated value of the remaining time R is equal to or less than the threshold value Rt (YES at step S907), the correspondence calculating part 172 of the feed axis motor control part 17 calculates the correspondence between the feed speed "v" and the remaining time R, based on the estimated value of the remaining time R by the remaining time estimating part 15, the detected value of the feed speed "v" by the feed speed detecting part 18, and the detected current value by the current detecting part 11 (step S909). Next, at step S910, the feed speed specifying part 173 of the feed axis motor control 60 part 17 specifies the target value vt of the feed speed "v" corresponding to the threshold value Rt of the remaining time R, based on the correspondence between the feed speed "v" and the remaining time R (see FIG. 7) to. Next, at step S911, the feed speed changing part 171 of the feed axis motor control part 17 starts override control for decreasing the feed speed "v" toward the above target value vt.

In the above way, according to the control system 1 of the present embodiment, once the remaining time R until the temperature of the spindle motor M1 reaches the maximum allowable temperature Tm becomes equal to or less than a threshold value Rt, the feed speed "v" is changed in accordance with the remaining time R at that instance, and therefore it is possible to reliably prevent the spindle motor M1 from falling into an overheated state. Furthermore, according to the control system 1 of the present embodiment, override control is performed for decreasing feed speed "v" toward the target value vt corresponding to the threshold value Rt of the remaining time R, and therefore it is possible to ensure that the remaining time R is constantly maintained near the threshold value Rt. As a result, it is possible to utilize the capacity of the spindle motor M1 to the maximum extent.

Effect of Invention

According to the first aspect of the present invention, once the remaining time until the temperature of the spindle motor reaches the maximum allowable temperature becomes equal to or less than a threshold value, the speed of feed motion is changed in accordance with the remaining time at that instant, and therefore it is possible to reliably prevent the spindle motor from falling into an overheated state.

According to the second aspect of the present invention, override control is performed for decreasing the speed of feed motion with a predetermined slope and by a predetermined amount of change, and therefore it is possible to simplify the configuration of the feed speed changing part and to lighten the system load due to the override control.

According to the third aspect of the present invention, override control is performed for decreasing the speed of feed motion and then increasing the speed of feed motion, and therefore it is possible to prevent the load of the spindle motor being held at a low level, and thus possible to utilize the capacity of the spindle motor more effectively.

According to a fourth aspect of the present invention, override control is performed for decreasing the speed of feed motion toward a speed value which corresponds to the threshold value of the remaining time, and therefore the above remaining time is constantly maintained near the threshold value. As a result, it is possible to utilize the capacity of a spindle motor to the maximum extent.

The present invention is not limited to the above-mentioned embodiment and can be modified in various ways within the scope described in the claims. Further, the dimensions, shapes, materials, etc. of the parts which were described in the above embodiments are only examples. Various dimensions, shapes, materials, etc. can be employed for achieving the effects of the present invention.

The invention claimed is:
1. A control system of a machine tool,
the machine tool including
a rotary spindle,
a feed axis configured to generate feed motion of said spindle with respect to a workpiece, and
a spindle motor configured to rotate the spindle,
the control system comprising:
a current detector configured to detect a current value of a current flowing through the spindle motor,
a temperature detector configured to detect, at a first time, a temperature value of a temperature of said spindle motor, a load calculator configured to calculate a load of the spindle motor based on the current value detected by the current detector, a controller configured to based on a predetermined maximum allowable temperature of said spindle motor and the temperature value detected at said first time, estimate a remaining time from the first time when the temperature value is detected until a second time when the temperature of said spindle motor reaches the maximum allowable temperature in a case where the current value detected by said current detector at said first time continues to flow through said spindle motor from the first time to the second time, perform override control of the spindle motor by changing a speed of said feed motion of the spindle in accordance with the estimated value of said remaining time, and repeat the override control of the spindle motor in accordance with the estimated value of said remaining time until the load of the spindle motor calculated by the load calculator is equal to or less than a continuous rated load of the spindle motor.

2. The control system according to claim 1, wherein said controller is configured to decrease the speed of said feed motion with a predetermined slope and by a predetermined amount of change in response to the estimated value of said remaining time being equal to or less than a predetermined threshold value.

3. The control system according to claim 2, wherein said controller is configured to decrease the speed of said feed motion by said amount of change, and then increase the speed of said feed motion by another amount of change smaller than said amount of change.

4. The control system according to claim 1, further comprising:

a speed sensor configured to detect a speed value of the speed of said feed motion, wherein the controller is configured to in response to the estimated value of said remaining time being equal to or less than a predetermined threshold value, calculate a correspondence between the speed of said feed motion and said remaining time based on the estimated value of said remaining time, the detected speed value, and the detected current value, specify a speed value of said feed motion corresponding to said threshold value of said remaining time, from said calculated correspondence, and decrease the speed of said feed motion toward the specified speed value.

* * * * *